Sept. 30, 1930.  L. DEUTSCH  1,776,942
GAUGE STICK
Filed June 27, 1927
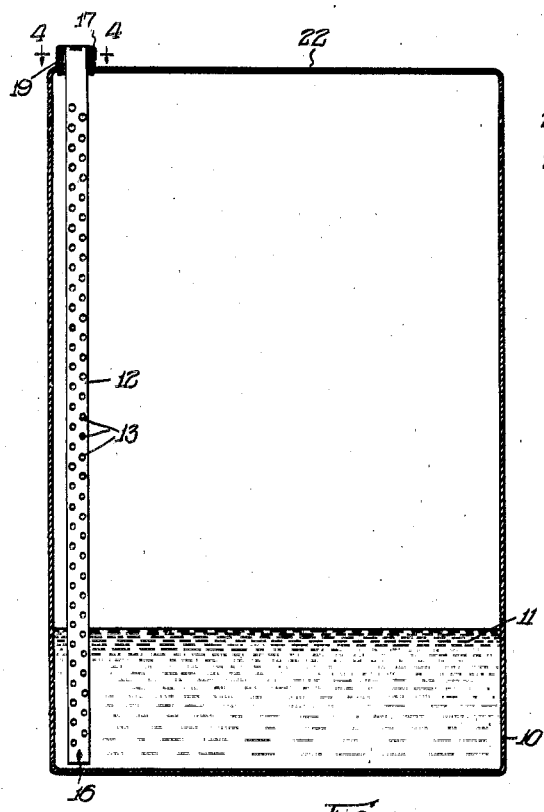
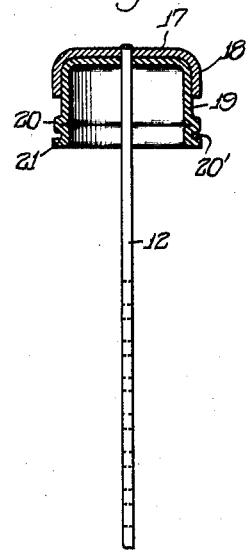
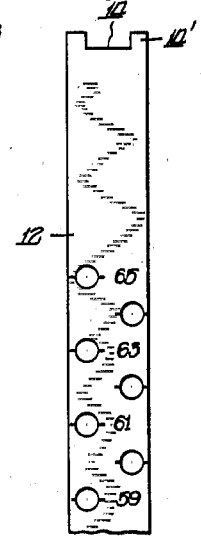
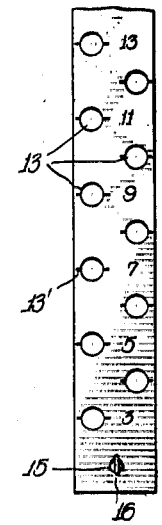
Witness:
R. Burkhardt
Inventor:
Leo Deutsch,
By Wilkinson, Huxley, Byron & Knight
attys Patented Sept. 30, 1930

1,776,942

UNITED STATES PATENT OFFICE

LEO DEUTSCH, OF BEAVER, PENNSYLVANIA, ASSIGNOR, BY MESNE ASSIGNMENTS, TO THE WAYNE PUMP CO., OF BALTIMORE, MARYLAND, A CORPORATION OF MARYLAND

GAUGE STICK

Application filed June 27, 1927. Serial No. 201,916.

This invention pertains to a novel measuring device, and more particularly to a measuring device which may be associated with a liquid container so that the amount of liquid in said container may be determined after the device is removed from the liquid.

It is sometimes desirable to ship liquid in a receptacle of a certain size, which receptacle is to be used as the liquid dispensing reservoir. As these receptacles oftentimes have to be shipped to distant points, it is almost impossible to ship them with any delicate mechanism thereon, such as measuring gauges; and in fact, it is almost impossible to have any large projection on said receptacles as there is a danger of it being broken off with consequent damage to the receptacle and loss of the liquid. Not only that but any delicate measuring instrument would be very expensive and consequently it can be readily understood that it would be very impractical to employ such instrument on portable reservoirs to be used in dispensing such liquids as oil or gasoline.

It is therefore an object of this invention to provide a novel measuring gauge which is inexpensive, easy to construct and effective in operation.

Another object is to provide a device which is non-breakable and may be readily applied to liquid receptacles for measuring the amount of liquid contained therein.

Still another object is to provide a measuring device which does not form objectionable protuberances on a liquid receptacle and which is adapted to be withdrawn from the liquid to determine the amount in the receptacle.

A further object is to provide a measuring device adapted to be applied to a liquid receptacle, said device having means thereon for positively indicating the amount of liquid in said receptacle, the size of the indicating means being determined by the viscosity of the liquid, and the disposition of the said means being determined by the size of the receptacle.

Still a further object is to provide a fitting on the receptacle adapted to cooperate with a part of the measuring device to hold the device in a predetermined position, said fitting being so constructed as to prevent disturbing the gauge when it is being withdrawn for a measuring reading.

Other, further and more specific objects will readily occur from the detailed description, claims and drawings appended hereto.

In the drawings, wherein like reference characters are used to designate like parts—

Figure 1 is a sectional elevation through a reservoir or tank, showing the application of the measuring device thereto;

Figure 2 is an enlarged sectional detail showing the relation between the cap of the gauge stick and the fitting provided on the tank for its support;

Figure 3 is an enlarged sectional detail of the blade of the gauge stick, taken substantially at right angles to the position of the stick shown in Figure 2; and Figure 4 is an enlarged sectional plan through the fitting, taken substantially on the plane as indicated by the lines 4—4 of Figure 1.

A liquid carrying refillable or non-refillable tank or reservoir 10 of any standard or known size for the liquid 11 may be provided, as standard equipment, with the gauge stick comprising a blade 12 preferably of metal. This blade 12 is graduated or calibrated with suitable apertures 13, the diameters of which vary according to the viscosity of the liquid to be contained in the tank. These apertures are preferably arranged in staggered relation and have suitable numerals opposite reading marks 13' corresponding to the center of the apertures, said numerals corresponding to the liquid capacity of the tank at that point. This blade is suitably fashioned at the top at 14 for the fastening of said blade to a suitable cap 17. At the bottom thereof, the blade may be provided with a hole 15 adapted to receive a locking means such as a cotter pin 16 for preventing the unauthorized removal of the gauge from the tank. The cap 17 may be fastened to the blade 12 by means of the cooperation of the lugs 14' provided on either side of the blade and corresponding apertures in the cap. This cap is preferably provided with an annular depending flange 18 so formed that the cap follows the contour of a suitable fitting 19 provided preferably in the top of the tank. This fitting 19 is preferably flanged and reflanged or corrugated at 20 and flanged at 21 providing a fastening means or channel 20' for cooperating with the edge of a suitable aperture provided in the top 22 of the tank, thereby providing an oil-tight or non-leakable connection between the fitting and the top. This cap is slotted at 23 for the reception of the blade and on each side and at each edge of the blade lugs 24 are provided extending toward the blade and adapted to contact the blade at the edges thereof free of the apertures 13, thereby preventing rubbing or wiping of the gauge while it is being removed and so as not to interfere with the operation of said apertures.

It will be readily understood that in the operation of this gauge to determine the level of the liquid in the tank, it is only necessary that the gauge be initially in the position as indicated in Figure 1; that is, with the cap 17 in contact with the fitting 19 and the blade in proper registering position. The liquid in the tank will fill or be directed into filling all of the apertures 13 in the blade up to the liquid level due to the capillary attraction between the liquid and the edges of the proper apertures. Then when the blade is raised by means of the cap 17, the proper apertures will remain filled with the liquid so that the level may be readily read by simply raising the gauge stick. It will be noticed that there is no danger of the apertures being freed from their liquid while the stick is being removed due to the guiding lugs 24 provided on the fitting 19. Also, there can be no unauthorized removal of the stick due to the cotter pin 16 provided in the bottom thereof. It will also be understood that this is a positive way of measuring the amount of liquid due to the fact that there is very little danger of the gauge becoming damaged as it is wholly protected within the tank. It will be further appreciated that when the liquid level falls in the tank, the apertures above this level will not remain filled with the liquid due to the affinity of the body of the liquid and the liquid in the apertures, in other words, surface tension of the liquid, and also due to the weight of the liquid held in the apertures which will tend to cause that liquid to gradually run down the stick to join the body of the liquid.

It will be understood that the embodiment of the invention described is merely by way of illustration and not by way of limitation as other and various forms of the device will readily occur to those skilled in the art.

I claim:

1. In a device of the character described, the combination of a liquid receptacle, a fitting disposed therein, a measuring device, said fitting having an aperture for the reception of said measuring device, said measuring device having means for determining the amount of liquid in said receptacle after said measuring device has been withdrawn from the liquid, said fitting having spaced guiding members forming a track for said measuring device, said guiding members being arranged to contact said device at points remote from said means whereby said means will determine the correct liquid level without interference by external sources.

2. In a device of the character described, the combination of a liquid receptacle, a measuring device therefor comprising means adapted to indicate the amount of liquid in said receptacle after said measuring device is withdrawn from the receptacle, supporting means for said measuring device cooperating with a portion of said measuring device to thereby cause said measuring device to hang in a predetermined position, and spacing members on said supporting means for contacting said measuring device to space said measuring device with respect to adjacent parts of the receptacle and supporting means whereby said first named means is only affected by the liquid in said receptacle.

3. In a measuring device for a substantially closed liquid containing receptacle, the combination of an upstanding fitting adapted to be secured to said receptacle and having a slot therein, a cap for closing said slot, said cap having downwardly directed portions for embracing said fitting, a measuring blade secured to said cap and extending through said slot into said receptacle, said blade having independent isolated spaced apertures disposed therein at predetermined intervals, said apertures being of such size as to be filled by liquid when immersed in same and to retain said liquid when said blade is removed from said liquid whereby the level and thereby the quantity of said liquid may be ascertained, said fitting having spaced guiding and positioning members extending into said slot and engaging the surfaces of said blade at points remote from said apertures to thereby maintain the blade in spaced relation with said receptacle and fitting and whereby the liquid contained in the apertures will not be disturbed when the blade is being withdrawn to determine the amount of liquid in said receptacle.

Signed at Rochester, Pennsylvania, this 22nd day of June, 1927.

LEO DEUTSCH.